Dec. 4, 1962 N. A. SCHUSTER 3,067,382
INDUCTION WELL LOGGING
Filed April 16, 1959 3 Sheets-Sheet 1

VERTICAL GEOMETRICAL FACTOR $$V(3) \int_0^\infty G(r,3)\,dr$$

RELATIVE SENSITIVITY

Nick A. Schuster
INVENTOR.

BY Robert Hockfield
ATTORNEY

Dec. 4, 1962 N. A. SCHUSTER 3,067,382
INDUCTION WELL LOGGING
Filed April 16, 1959 3 Sheets-Sheet 2

Nick A. Schuster
INVENTOR.

BY Robert Hockfield

ATTORNEY

United States Patent Office 3,067,382
Patented Dec. 4, 1962

1

3,067,382
INDUCTION WELL LOGGING
Nick A. Schuster, Houston, Tex., assignor to Schlumberger Well Surveying Corporation, Houston, Tex., a corporation of Texas
Filed Apr. 16, 1959, Ser. No. 806,874
1 Claim. (Cl. 324—6)

The present invention relates to induction well logging and, more particularly, pertains to new and improved electromagnetic apparatus for obtaining indications of the electrical conductivity of the earth formations traversed by a borehole.

It has become accepted oil field practice to determine the electrical conductivity of earth formations by utilizing induction logging systems which incorporate the highly-effective focussing techniques disclosed in Patent Nos. 2,582,314 and 2,582,315, both of which issued on January 15, 1952, to H. G. Doll. The present invention relates to induction well logging apparatus utilizing focussing techniques to provide improved vertical resolution while minimizing effects on radial penetration.

Accordingly, it is an object of the present invention to provide new and improved induction well logging apparatus for obtaining indications of the conductivity of the earth formations traversed by a borehole.

Another object of the present invention is to provide new and improved induction well logging apparatus affording improved vertical resolution.

These and other objects of the invention are obtained by providing a plurality of transmitter-receiver two-coil systems adapted to pass through a borehole which penetrates earth formations to be explored. A source of electrical energy is coupled to the two-coil systems to energize the same and electrical indicating means is coupled to receive the responses of the two-coil systems. Each of the foregoing two-coil systems produces a total response proportional to $$\frac{(\pm S_\text{T})(\pm S_\text{R})}{D_\text{TR}}$$

where $D_\text{TR}$ is one-half the separation distance between the pair of coils considered, $S_\text{T}$ is the total area of the transmitter coil of the pair and $S_\text{R}$ is the total area of the receiver coil of the pair, plus or minus being assigned to the areas $S_\text{T}$ and $S_\text{R}$ depending upon the relative polarities of the corresponding coils. One of the two-coil systems exhibits a response of a particular polarity and an absolute magnitude at least equal to the response of any of the remaining two-coil systems thereby being definable as a main pair whose coils have a given separation distance. The algebraic sum of the responses of all two-coil systems effectively disposed to one side of one coil of the main pair, and including that coil, is of a polarity opposite to the polarity of response of the main pair.

The novel features of the present invention are set forth with particularity in the appended claim. The present invention, both as to its organization and manner of operation, together with further objects and advantages thereof, may best be understood by reference to the following description taken in connection with the accompanying drawings in which:

Figure 1:
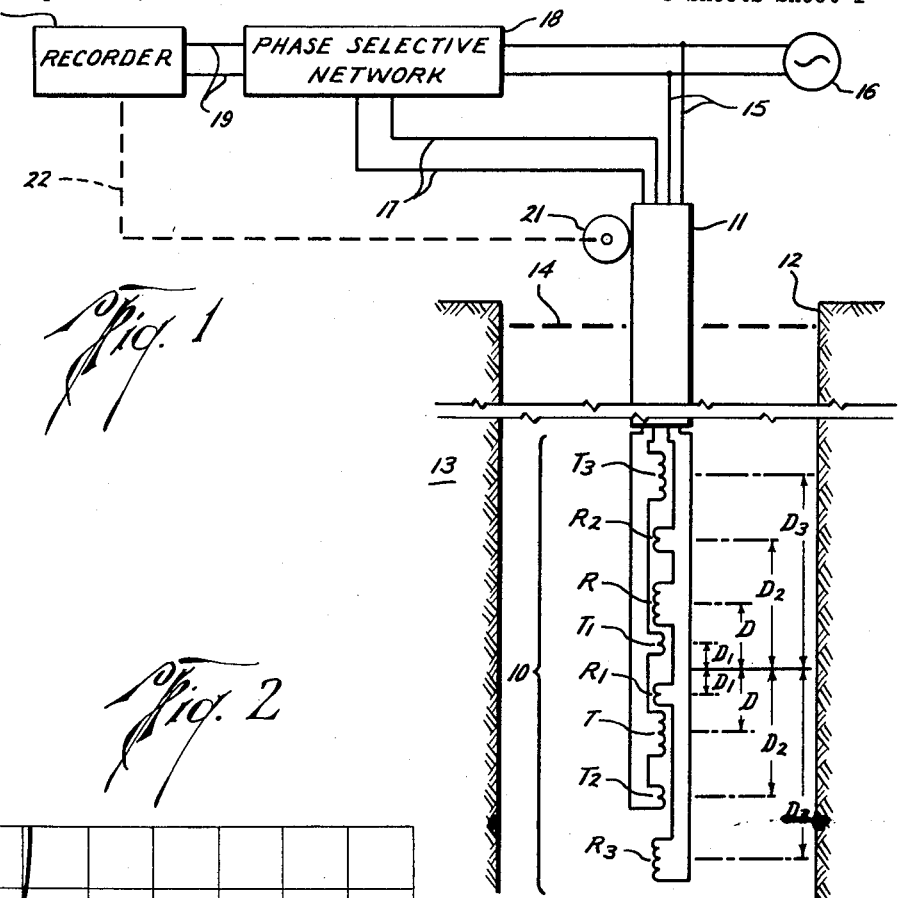
FIG. 1 is a schematic diagram of two-coil systems illustrative of apparatus constructed in accordance with the present invention.
Figure 6:
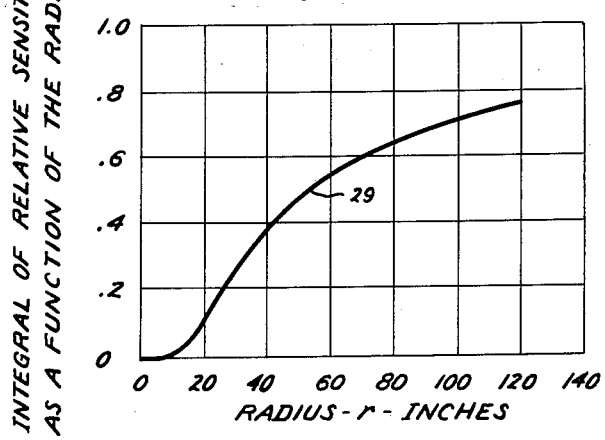

And FIG. 6 illustrates the integrated radial geometrical factor for the apparatus of FIG. 1.

In FIG. 1 of the drawings, a coil system 10 is shown suspended by an electric armored cable 11 in a borehole 12 which penetrates earth formations 13. The borehole 12 may be empty or it may be filled with a drilling mud 14, as shown. By means of a conventional winch (not shown) on which the cable 11 is spooled, the coil system 10 may be lowered and raised through the borehole 12 in a customary manner.

The coil system 10 includes a plurality of transmitter coils and receiver coils having selected numbers of turns having particular spacial relationships and polarities to be described more fully hereinafter. Included in coil system 10 are transmitter coils T, $T_1$, $T_2$ and $T_3$ connected in series and energized via insulated conductors 15 of cable 11 by an alternating current source 16 located at the surface of the earth. Receiver coils R, $R_1$, $R_2$ and $R_3$ of the system 10 are also connected in series and are connected by insulated cable conductors 17 to an input circuit of a phase selective network 18. Network 18 receives a reference signal from source 16 and supplies to output leads 19 a selected component of the input signal available at leads 17. For example, network 18 may be constructed in accordance with the teachings of Doll Patent No. 2,788,483 so as to develop an output signal at leads 19 representing the conductive component to the exclusion of reactive signal components. The output signal is supplied to a recorder 20 having a recording medium driven by a measuring wheel 21 mechanically coupled to cable 11 through an appropriate linkage, schematically illustrated by a broken line 22. Thus, a continuous log of the conductivity of earth formations 13 as a function of depth in borehole 12 is obtained in a known manner.

In general, the total signal response induced by the formation in any two-coil system is proportional to $$\frac{(\pm S_\text{T})(\pm S_\text{R})}{D_\text{TR}}$$

where $D_\text{TR}$ is one-half the separation distance between the pair of coils considered, $S_\text{T}$ is the total area of the transmitter coil of the pair and $S_\text{R}$ is the total area of the receiver coil of the pair, plus or minus being assigned to the areas $S_\text{T}$ and $S_\text{R}$ depending upon the relative polarities of the corresponding coils. In the illustration of FIG. 1, the coils T and R are connected in their respective transmitter and receiver circuits so that a positive signal in the transmitter produces a positive signal in the receiver thus establishing a particular polarity. Moreover, coils T and R are of such size and spacing that the response calculated in accordance with relationship 1 above, for the system T, R is at least equal to the response of any of the remaining two-coil systems. Thus, two-coil system T, R is designated as a main pair having a separation distance 2D.

It has been discovered that, with reference to the main pair T, R, if the algebraic sum of the responses of all two-coil systems disposed to one side of either T or R and including either T or R is of opposite polarity relative to the response of the main pair T, R, excellent vertical resolution characteristics are obtained. Moreover, this is achieved without seriously impairing the radial penetration. In addition, the effect of beds adjacent to a particular bed under investigation do not appreciably affect the accuracy of the conductivity measurements of the particular bed. The algebraic sum of the responses of the two-coil systems disposed to one side of the main pair, can be of any value; however, it has been found that the sum should be as large as practicable. In many applications the sum should not exceed approximately one-fourth of the response of the main pair.

In a typical embodiment of the present invention, the following design data were employed:

$$T=R=+1$$
$$T_1=R_1=-0.033$$
$$T_2=R_2=-0.12$$
$$T_3=R_3=-0.23$$

(the plus or minus sign indicating the polarity of a particular coil):

$$D=20''$$
$$D_1=5''$$
$$D_2=38''$$
$$D_3=53''$$

Obviously, all numbers of turns of either the receiver or transmitter coils, or both, may be multiplied by a common factor.

From calculations employing relationship 1 and the above design data, it will be seen that the algebraic sum of the responses of all transmitter-receiving pairs to one side or outside the main pair T, R and including either T or R, as the case may be, is of a polarity opposite to the polarity of the response of the main pair thus complying with the requirements set out hereinbefore.

Figure 2:
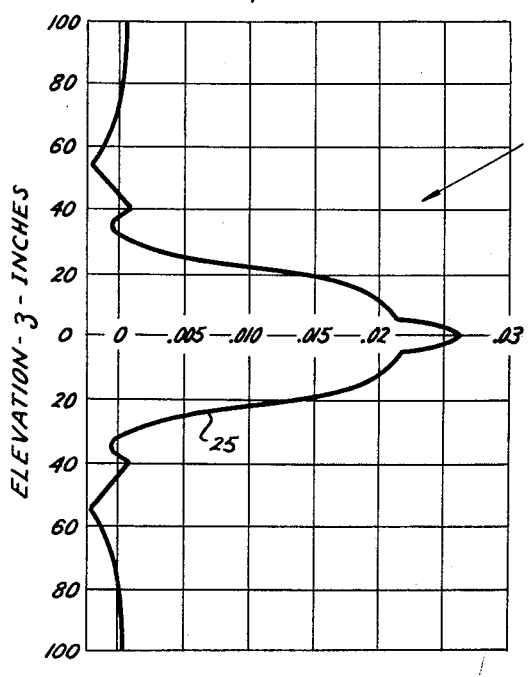
FIG. 2 is a graph illustrating a typical vertical sensitivity curve for the apparatus shown in FIG. 1.
Figure 3:
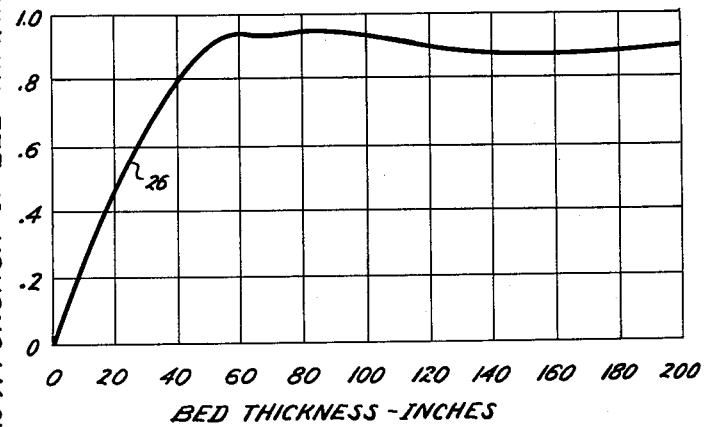
FIGS. 3 and 4 are graphs illustrating the integrated vertical geometrical factor for the apparatus of FIG. 1.
Figure 4:
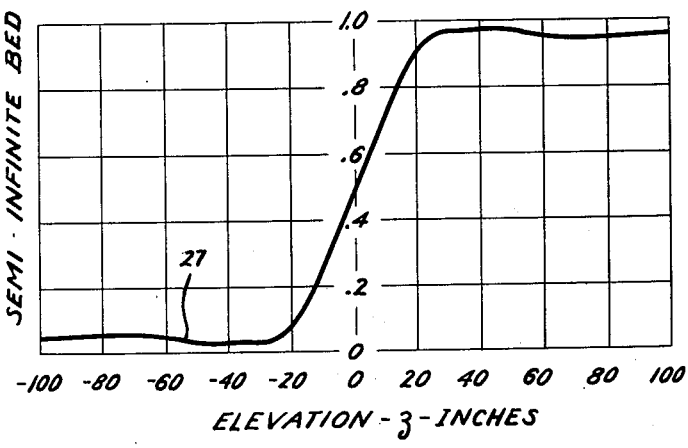

In FIG. 2, curve 25 is a plot of the relative contributions of a thin layer of formation as a function of vertical distance from the center of the main pair, usually referred to as the vertical geometrical factor. From this curve it is evident that excellent vertical resolution, i.e., the ability to depict the conductivities of relatively thin beds with accuracy, is afforded by apparatus embodying the present invention. This is also evident from an inspection of FIGS. 3 and 4. Curve 26 in FIG. 3 illustrates the relative contribution of a bed on which the main pair is centered, as a function of bed thickness. Curve 27 in FIG. 4 illustrates the relative contribution of a bed extending from infinity to a given distance from the center of the main pair, as a function of this distance.

Figure 5:
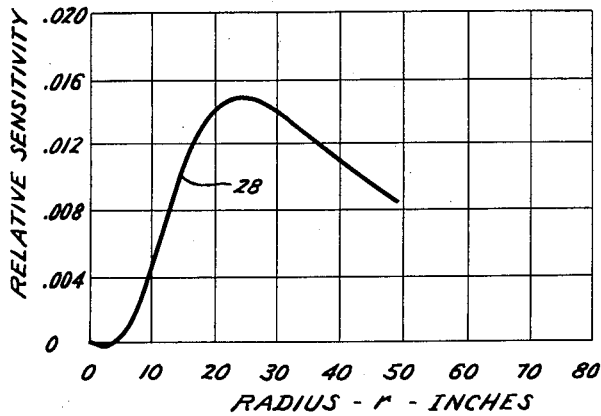
FIG. 5 is a graph illustrating the radial or lateral investigation characteristics of the apparatus shown in FIG. 1.

As shown by curve 28 in FIG. 5, which is a plot of relative contributions of a cylindrical shell of formation, as a function of radial or lateral distance from the axis of the coil system 10 to the shell, appreciable conductivity information beyond twenty inches is obtained. The lateral penetration is perhaps more evident in FIG. 6 in which curve 29 represents the integrated radial geometrical factor.

It is thus apparent that apparatus embodying the present invention features excellent vertical resolution, i.e., relatively thin beds may be accurately measured. At the same time, the radial penetration is relatively good.

While a particular embodiment of the present invention has been shown and described, it is apparent that changes and modifications may be made without departing from this invention in its broader aspects, and therefore the aim in the appended claim is to cover all such changes and modifications as fall within the true spirit and scope of this invention.

What is claimed is:

Apparatus for investigating the electrical characteristics of earth formations traversed by a borehole comprising: a coil system adapted to be passed through a borehole and including a series of eight individual coils coaxially aligned with and vertically spaced apart from one another, the individual coils being located along the common axis in the following order: an auxiliary receiver coil, an auxiliary transmitter coil, a main transmitter coil, an auxiliary receiver coil, an auxiliary transmitter coil, a main receiver coil, an auxiliary receiver coil, and an auxiliary transmitter coil; means for energizing the transmitter coils with alternating current so that the auxiliary transmitter coils are energized in an opposite polarity sense relative to the main transmitter coil; indicating means coupled to the receiver coils with the auxiliary receiver coils being connected in an opposite polarity sense relative to the main receiver coil; each transmitter-receiver coil pair having a relative response of $$\frac{(\pm S_T)(\pm S_R)}{D_{TR}}$$

where $D_{TR}$ is one-half the separation distance between the coils being considered, $S_T$ is the total area of the transmitter coil being considered and $S_R$ is the total area of the receiver coil being considered, plus or minus being assigned to the areas $S_T$ and $S_R$ depending upon the relative polarities of the corresponding coils; the coil pair formed by the main transmitter and main receiver coils exhibiting a relative response of a particular polarity and a magnitude greater than the relative response of any other pair of transmitter and receiver coils; and the algebraic sum of the responses of all transmitter-receiver coil pairs disposed to one side of the main-transmitter main-receiver pair, including any pair formed with the adjacent one of the main transmitter and main receiver coils, being of a polarity opposite to said particular polarity.

References Cited in the file of this patent

UNITED STATES PATENTS

| | | |
|---|---|---|
| 2,582,314 | Doll | Jan. 15, 1952 |
| 2,582,315 | Doll | Jan. 15, 1952 |
| 2,723,375 | Schuster | Nov. 8, 1955 |
| 2,761,103 | Doll | Aug. 28, 1956 |